(12) United States Patent
Breneman et al.

(10) Patent No.: US 6,769,494 B2
(45) Date of Patent: Aug. 3, 2004

(54) COMBINATION LINE TRIMMER AND EDGER

(75) Inventors: Matthew R. Breneman, Lawrenceville, GA (US); John P. Leffler, Alpharetta, GA (US); James F. Hutfles, Buford, GA (US)

(73) Assignee: PowerQwest, Inc., Duluth, GA (US)

( * ) Notice: Subject to any disclaimer, the term of this patent is extended or adjusted under 35 U.S.C. 154(b) by 0 days.

(21) Appl. No.: 10/135,930

(22) Filed: Apr. 29, 2002

(65) Prior Publication Data

US 2003/0037933 A1 Feb. 27, 2003

Related U.S. Application Data

(60) Provisional application No. 60/287,364, filed on Apr. 30, 2001.

(51) Int. Cl.[7] .................................................. A01D 34/84
(52) U.S. Cl. .......................................... 172/14; 56/12.7
(58) Field of Search ............................ 56/12.7; 172/13, 172/14, 15

(56) References Cited

U.S. PATENT DOCUMENTS

| | | | | |
|---|---|---|---|---|
| 5,603,205 A | * | 2/1997 | Foster ........................ | 56/16.7 |
| 5,669,101 A | * | 9/1997 | Aiyama et al. ................ | 16/436 |
| 5,867,911 A | * | 2/1999 | Yates et al. .................... | 30/276 |
| 5,933,966 A | * | 8/1999 | Yates et al. .................... | 30/276 |
| 6,260,278 B1 | * | 7/2001 | Faher .......................... | 30/276 |
| 6,301,866 B1 | * | 10/2001 | Marshall et al. .............. | 56/233 |
| 6,439,088 B1 | * | 8/2002 | Eytchison et al. ............. | 83/13 |
| 6,460,319 B2 | * | 10/2002 | Marshall et al. .............. | 56/233 |
| 6,516,598 B1 | * | 2/2003 | Notaras et al. ............... | 56/16.7 |
| 6,604,349 B2 | * | 8/2003 | Deal ........................... | 56/12.7 |

* cited by examiner

Primary Examiner—Thomas B. Will
Assistant Examiner—Alexandra K. Pechhold
(74) Attorney, Agent, or Firm—Myers & Kaplan, LLC; Barry E. Kaplan, Esq.; Sandra Sovinski, Esq.

(57) ABSTRACT

An improved vegetation trimmer and edging unit for lawn and garden use provides a multi-position front handle, an integral roller edging guide having a flange concentrically located about the motor shaft and being of sufficient diameter to maintain a consistent distance between the cutting plane and the object being edged around, activation switches equally convenient to either operating position, and a power source mounted in a location equally balanced in either operating position. The combination vegetation trimmer and edger unit may be used in a first, horizontal cutting plane position for lawn trimming, and may be further used in a second, vertical cutting plane position for edging.

43 Claims, 9 Drawing Sheets

COMBINATION LINE TRIMMER AND EDGER

CROSS-REFERENCE TO RELATED APPLICATIONS

The inventors hereof claim the benefit of U.S. provisional patent application serial No. 60/287,364 filed Apr. 30, 2001.

TECHNICAL FIELD

The present invention relates, generally, to improved vegetation trimmer and edging units for lawn and garden use; and, more specifically, to a combination vegetation trimmer and edging unit, further providing, in a preferred embodiment, a multi-position handle, a roller edging guide with a flange concentrically located about the motor shaft, dual-position activation switches symmetrically located about the central shaft of the unit; and, a power source located symmetrically in-line with the center of the shaft of the unit.

BACKGROUND

For many years, powered line or blade-type trimmers have been offered for the trimming of lawns, cutting in the horizontal plane. Similarly, powered edgers have been offered for the edging of lawns adjacent to walkways and driveways, cutting in the vertical plane.

Consumers, in their desire to purchase and utilize only one tool for these similar lawn cutting purposes, have attempted to use trimmers of the aforementioned type, intended for use in a horizontal position for grass trimming purposes, in a rotated, vertical plane to function as a lawn edger.

Most of these units have a control handle, containing the activation switches, and an additional front handle for support of the unit's weight and for use in maneuvering the unit in use. Disadvantageously, however, due to the designs of these handles, many units are not convenient or safe to use for edging. Often only a single front handle position is provided, optimized for use in the lawn trimming horizontal plane. Accordingly, when the unit is held in the edging position, the front handle is generally in an inconvenient and off-balance position. This condition is aggravated by the non-symmetrical positioning of the heavy power source in many units. With such units, a position of balance for trimming will not be a position of balance for edging.

Further contributing to the inconvenience in use of such units in the vertical plane edging position, the activation trigger is frequently located in a position suited only to trimming in the horizontal plane. A switch or trigger that is not in a convenient position raises the dual concerns that the unit might be started by accident, resulting in a unit that is both difficult to use and unsafe, or might be difficult to stop in an emergency situation.

Recent units have been developed that make it more convenient and comfortable for the operator of the unit to more easily hold the unit in the desired vertical edging position. Some such units have devices provided for the rotation of the trimmer head about its shaft, in effect allowing rotation of the cutting plane. Often, however, such rotation devices are cumbersome and inconvenient to use.

For edging use, orientation devices also have been developed to help guide the trimmer with a consistent motion, so as to give the trimmed edge a neat appearance. Many such devices of this type comprise wheel-and-bracket arrangements, rubbing pads, or wire guide loops, configured to hold the trimmer at a relatively consistent position.

Most of the wheel-and-bracket arrangements are of an A-frame type, with wheels mounted on the frame and the frame clamped to the shaft of the trimmer. Some of these types of devices allow the user to loosen the clamp and rotate the trimmer into an edger position. U.S. Pat. No. 4,922,694 to Emoto and U.S. Pat. No. 5, 450,715 to Murray are examples of this kind of device. Some of these devices, such as U.S. Pat. No. 4,224,784 to Hansen et al. have the wheels rotated 90 degrees to function as an edging guide. Still other designs have plates clamped to the shaft which held wheels in an edging configuration, such as in U.S. Pat. No. 4,981,012 to Claborn. Other devices, such as U.S. Pat. No. 5,228,276 to Miller, are merely axles which bolt to the trimmer.

Through the use of these wheel-and-bracket attachments, the orientation of the cutting plane to the adjacent vertical curbing surface can be controlled in a more consistent manner. Those devices lacking the further enhancement of a vertical-plane feature are less effective, and many of the wheels are so small in diameter that they cannot accommodate imperfections in the reference surface without bounding. In general, these devices can be unwieldy to install, to use, and to store.

These wheel-and-bracket devices are usually low-friction in use, however, making them superior to the high-friction wire loop and rubbing block orientation devices. Such high-friction devices will grab and skip over the reference surface when used, leading to inconsistent results. Additionally, the rubbing block or wire loop features share another disadvantage with the wheel-and-bracket attachments: the edging position, as effected by the orientation device, is dependent upon the operating angle of the trimmer unit. The user must maintain a consistent operational position at all times to avoid a varied edging effect. Line trimmers with these orientation devices, therefore, do not provide a single tool solution to the problem identified by many consumers.

It is, therefore, readily apparent that there is a need for a new and improved combination vegetation trimmer and edging unit, further providing, in a preferred embodiment, two equally-convenient operating and control positions, a power source positioned to allow consistent operating balance in trimming or edging, an integrated, large diameter, vertically-flanged roller edging guide, and dual-position activation switches located about the shaft of the unit; and, in an alternate embodiment, the above-referenced power source including a battery.

It is, therefore, to the provision of such an improved unit that the present invention is directed.

BRIEF SUMMARY OF THE INVENTION

Briefly described, in a preferred embodiment, the present invention both overcomes the above-mentioned disadvantages, and meets the recognized needs for such a unit, by providing a vegetation trimmer unit with an operating and control position that changes easily from a position convenient for trimming, to one that is convenient for edging.

The unit, accordingly, is provided preferably with two sets of activation switches which, through their symmetrical location about the control handle of the unit, and when used in association with the multi-position front handle and control handle of the unit, allow the operator to easily flip or rotate the unit into a second operating position (from trimming mode to edging mode and vice versa), and, thereby, to maintain the controls in the exact same position with respect to the operator. In this manner, the convenience to, and safety of, the operator is optimized in either position.

In edging mode, a flanged roller edging guide that is preferably integral to the trimmer housing assembly assists the operator in creating a uniformly-trimmed edge, and eliminates the need for complicated appendages or techniques to perform this function. Advantageous to the present invention, the roller edging guide is integral to the trimmer housing assembly is and concentrically located about the motor shaft. Because of this orientation, the roller edging guide can be of sufficient diameter to allow easy rolling on imperfect reference surfaces, while maintaining a consistent distance between the cutting plane and the object being edged, regardless of the angular orientation of the trimmer with respect to the operator or the working plane.

In a preferred embodiment, the power source (e.g., a battery) for the unit is located in a symmetrical, in-line orientation with respect to the shaft of the unit. This orientation serves to ease the rotation of the unit between control positions, and also facilitates a consistent feel during use in either of the two modes (trimming and edging) of operation. This consistency of feel is manifested in the way that the mass of the power source affects the operational maneuverability of the unit. Accordingly, in either position the unit is equally well balanced.

Thus, it is an object of the present invention to provide a new and improved combination vegetation trimmer and edger that has a multi-position front handle which may be easily indexed amongst positions equally convenient to either operating position.

It is another object of the present invention to provide a new and improved combination vegetation trimmer and edger that has motor activation switches equally convenient to either operating position.

It is a further object of the present invention to provide a new and improved combination vegetation trimmer and edger that has an edging roller with a flange that is integral to the trimmer housing, which operates to assist the operator in creating a distinct trimmed edge, and which eliminates the need for complicated apparatus to perform this function.

It is yet a further object of the present invention to provide a new and improved combination vegetation trimmer and edger wherein the roller edging guide is concentrically located about the motor shaft, and whereby the roller edging guide is of sufficient diameter to allow easy rolling on most surfaces, while maintaining a consistent distance between the cutting plane and the object be edged around.

It is still a further object of the present invention to provide a new and improved combination vegetation trimmer and edger with a power source mounted in a location equally balanced in either operating position.

It is yet a further object of the present invention to provide a new and improved combination vegetation trimmer and edger which may easily be used as a conventional trimmer, intended for use in a horizontal position for grass and weed cutting purposes, and then rotated into a vertical plane to function as a lawn edger, all while providing secure and convenient control of the unit in either such position, along with a balanced aspect and safe operation.

Other objects, features, and advantages of the present invention will become apparent to those ordinarily skilled in the art by reference to the accompanying Drawing Figures and to the Detailed Description of the Preferred Embodiment presented herein.

BRIEF DESCRIPTION OF THE FIGURES

The present invention will be better understood by reading the Detailed Description of the Preferred Embodiment with reference to the accompanying drawing Figures, in which like reference numerals denote similar structure and refer to like elements throughout, and in which.

DETAILED DESCRIPTION OF THE PREFERRED EMBODIMENTS

Figure 1:
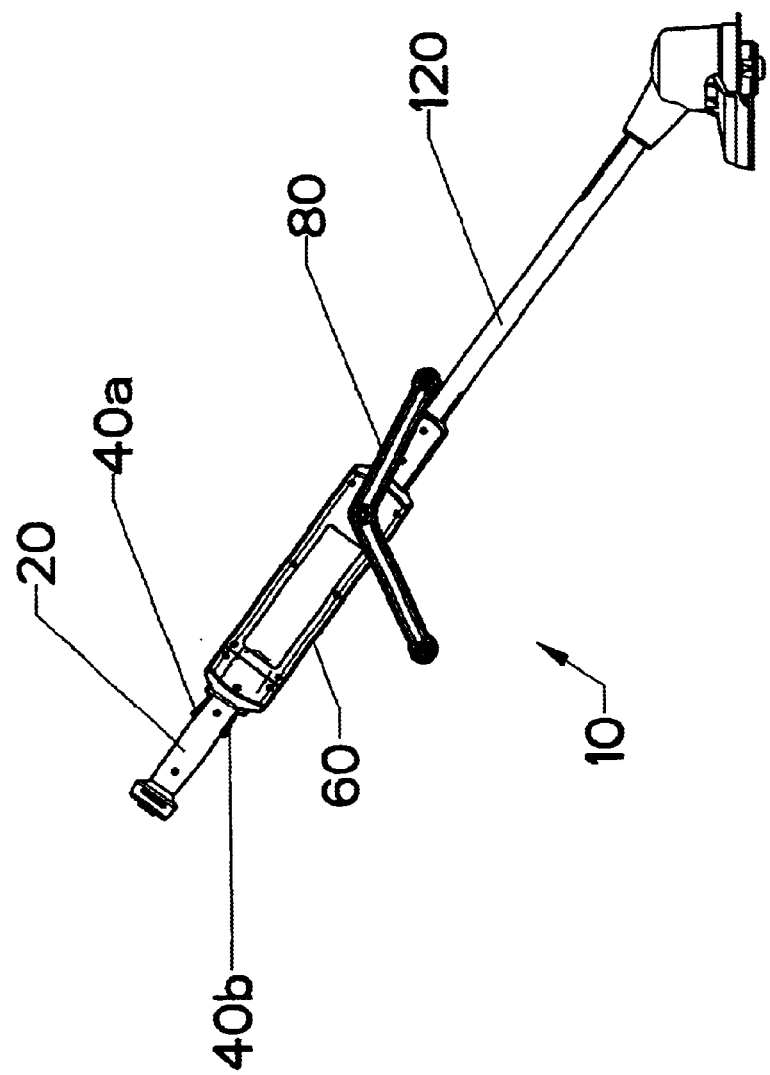
FIG. 1 is a side view of the combination lawn trimmer and edger unit of the present invention, demonstrating the handle and trimmer housing in the trimmer configuration.

In describing the preferred and alternate embodiments of the present invention illustrated in the Figures, specific terminology is employed for the sake of clarity. The invention, however, is not intended to be limited to the specific terminology so selected, and it is to be understood that each specific element includes all technical equivalents that operate in a similar manner to accomplish a similar purpose.

Shown in FIGS. 1–8 is a combination lawn trimmer and edger unit 10 of the present invention according to a first embodiment. Unit 10, generally, is provided with two sets of activation and safety switches 40a, 40b which, through their symmetrical location about shaft 120 of unit 10, when used in association with multi-position front handle 80 and control handle 20 of unit 10, allow the operator to easily flip or rotate unit 10 into a second operating position (from trimming mode to edging mode and vice versa), and, thereby, to maintain the controls in the exact same position with respect to the operator. In this manner, the convenience to, and safety of, the operator is optimized in either position.

Figure 2:
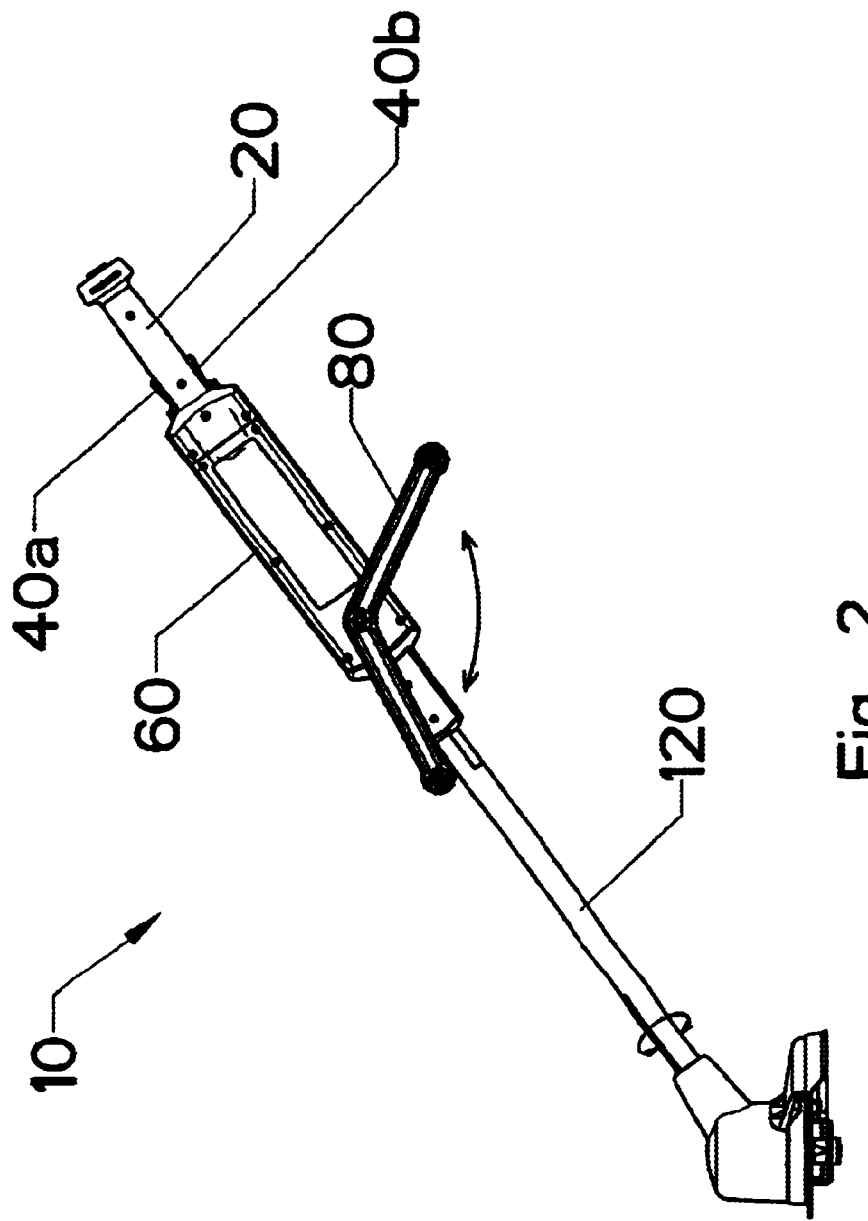
FIG. 2 is a side view of the combination lawn trimmer and edger unit of the present invention, demonstrating the handle and trimmer housing in the edger configuration.
Figure 3:
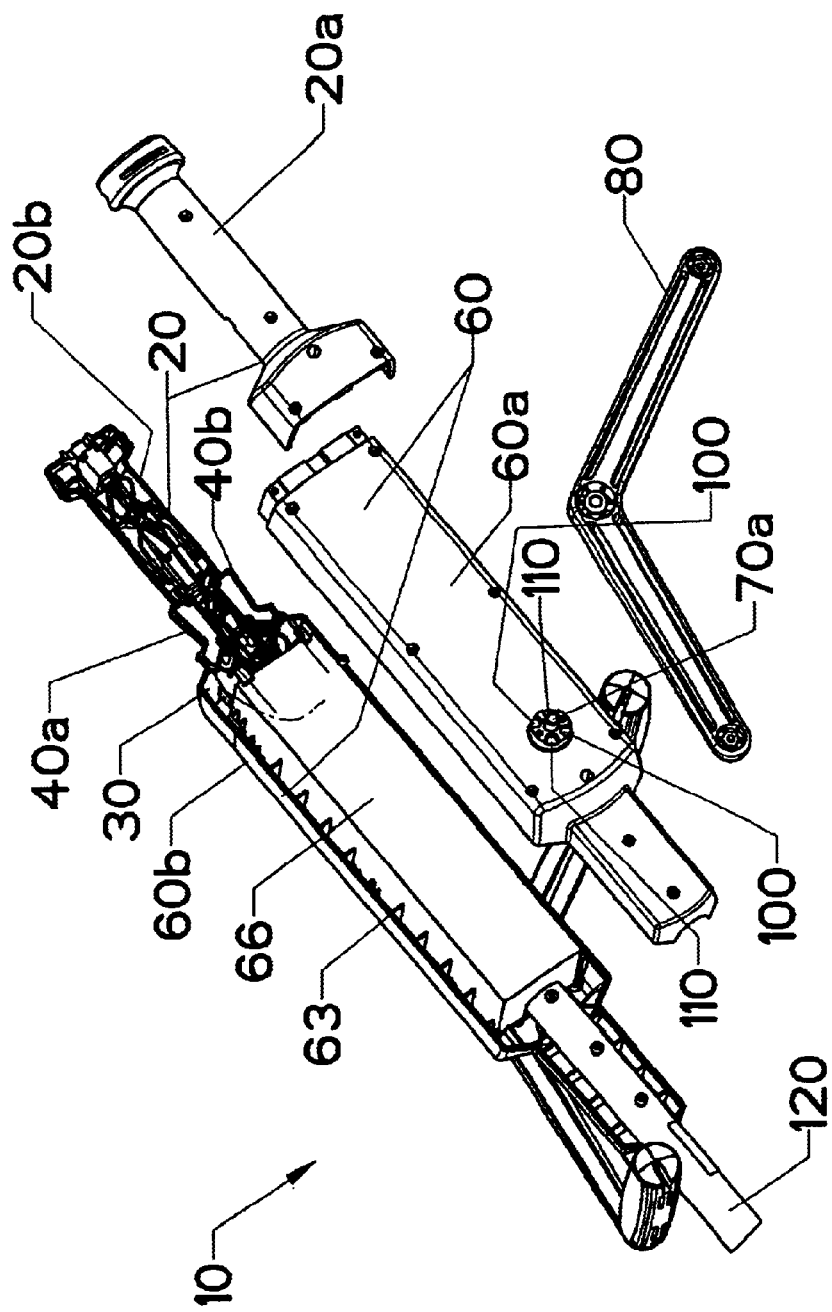
FIG. 3 is an exploded perspective view of the handgrip, handle, and battery housing of the combination lawn trimmer and edger unit of the present invention.

Specifically, with first reference to FIGS. 1–3, unit 10 generally comprises control handle 20, which is formed in two halves 20a, 20b. Integrally molded retainers 30 within control handle 20 retain two switches 40a, 40b. Halves 20a, 20b of control handle 20 are fastened together, which results in switches 40a, 40b being captured in place.

Switches 40a, 40b are located symmetrically about shaft 120 of unit 10. This arrangement will be seen to allow the operator of unit 10 easily to rotate unit 10 about the axis of shaft 120; thereby, resulting in switches 40a, 40b advantageously being in the same control position relative to the operator, and eliminating the necessity of being required to hold the trimmer in an attitude that would cause unsafe or unmanageable operation.

Switches 40a, 40b are of a safety lockout type. In order for unit 10 to function, one switch 40a, 40b must be in the enable, trigger-lock release mode, whereupon the other switch 40a, 40b then acts like a conventional, trigger-type on/off switch. These functions are reversed upon rotation of unit 10, so that a trigger 40a, 40b is always in the most convenient position for the operator, regardless of whether unit 10 is being used in the trimmer operating position or in the edger operating position. Accordingly, so long as one switch 40a, 40b is in the enable mode and the other switch has the trigger engaged, unit 10 will function.

Control handle 20 is connected at its lower end to the upper end of battery housing 60. Battery housing 60 is also preferably formed in two halves 60a, 60b, which are fastened together. Integrally molded battery positioning retainers 63 hold battery 66 in place. Battery 66 preferably comprises an elongated configuration and is positioned within unit 10 so as to give unit 10 optimal operational balance. Because battery 66 is symmetrically located in-line with the centerline of shaft 120, the user easily may rotate unit 10 between and amongst its two operating positions.

Battery housing halves 60a, 60b further comprise pivot pins 70a, 70b for front handle 80. As best seen with reference to FIGS. 7 and 8, pivot pins 70a, 70b preferably are molded or otherwise affixed into battery housing halves 60a, 60b. Front handle 80 simply snaps over pivot pins 70a, 70b.

Front handle 80 is held in an operator selected position by tapered locating cams 90, which engage a first set of slots 100 on battery housing 60. A relatively small amount of force is all that is required to index front handle 80 to a second position. Once front handle 80 has been indexed into its second position, tapered locating cams 90 then engage a second set of slots 110, which hold front handle 80 in its second position.

The lower end of battery housing 60 is fastened to the upper end of shaft 120.

Figure 4:
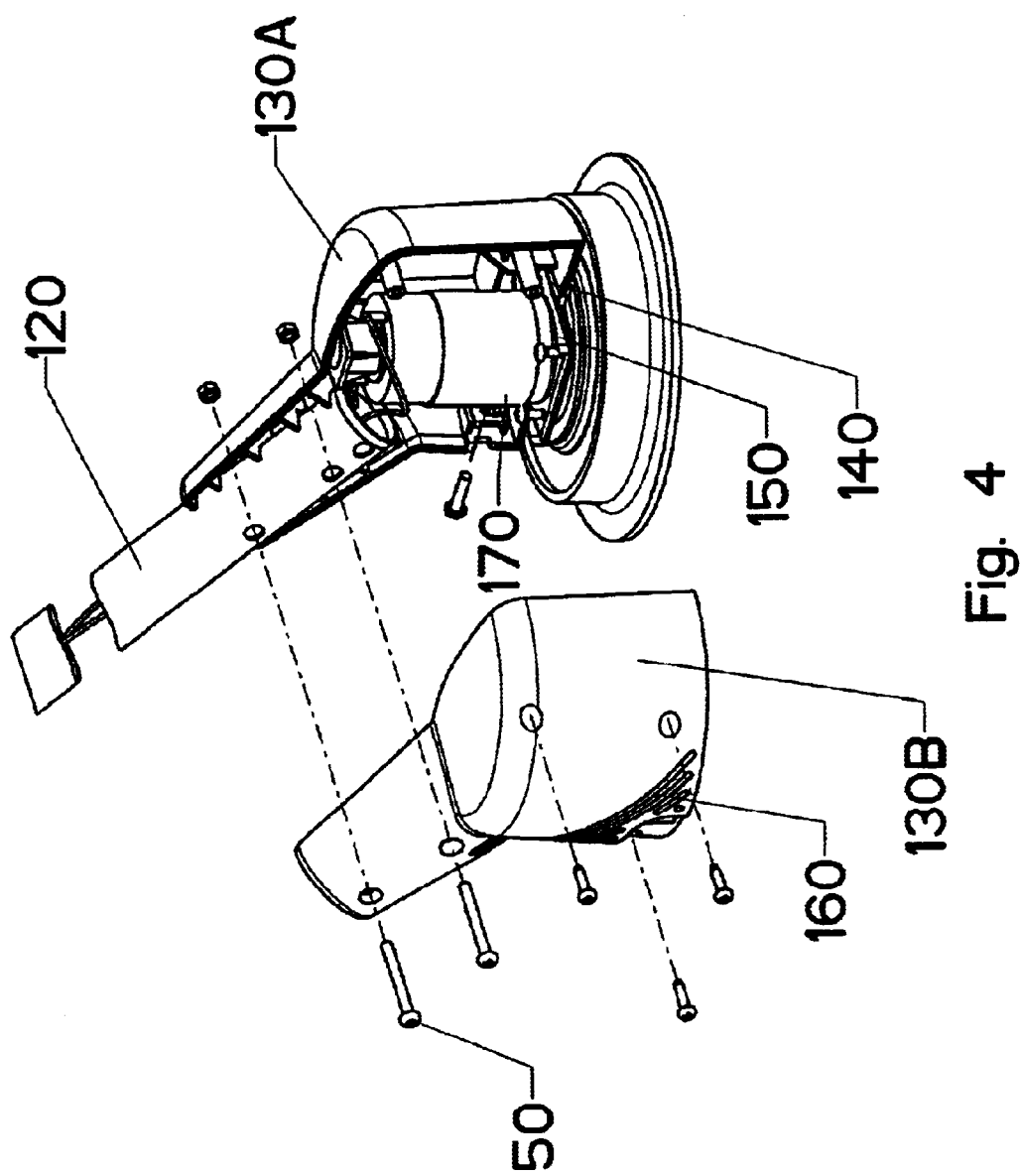
FIG. 4 is an exploded perspective view of the shaft, trimmer housing, roller edging guide, and motor assembly of the combination lawn trimmer and edger unit of the present invention.

Referring next to FIG. 4, lower end of shaft 120 is affixed to the upper end of trimmer housing 130. Trimmer housing 130 preferably is formed in two halves 130a, 130b, which are fastened together. Integrally molded retainers 140 within two halves 130a, 130b of the trimmer housing 130 hold motor mounting plate 150 in position. Openings 160 are provided to permit air to flow freely to motor assembly 170 for cooling.

Figure 5:
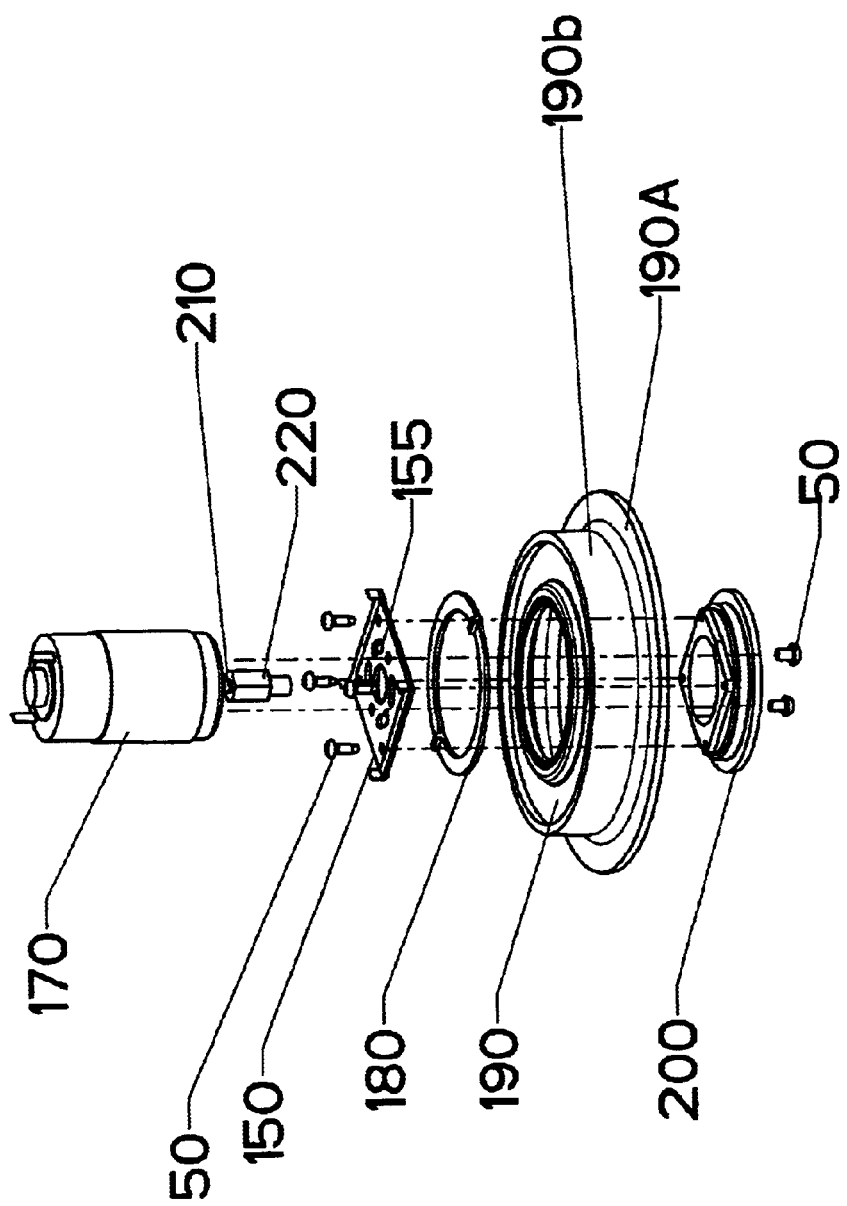
FIG. 5 is an exploded perspective view of the roller edging guide and motor assembly of the combination lawn trimmer and edger unit of the present invention.

Referring next to FIG. 5, motor mounting plate 150 is provided with openings 155 to permit affixation and mounting of motor assembly 170. Accordingly, motor assembly 170 is affixed to the upper side of motor mounting plate 150. The upper side of flange washer 180 contacts the lower side of trimmer housing 130. The upper side of edging roller 190 contacts the lower side of flange washer 180. Bottom flange 200 contacts lower side of edging roller 190, and is affixed to the lower side of motor mounting plate 150. In such position, bottom flange 200 holds flange washer 180 and edging roller 190 in position, yet allows edging roller 190 to freely rotate. Flange area 190a of edging roller 190 contacts the ground or other working surface and allows the operator to maintain a uniform edge when unit 10 is used in the edging position.

Advantageous to the present invention, edging roller 190 is integral to trimmer housing 130 and is concentrically located about motor shaft 210. Edging roller 190 is of sufficient diameter to allow easy rolling on most surfaces, while maintaining a consistent distance between the cutting plane and the object be edged around.

Accordingly, in edging mode, flanged edging roller 190 assists the operator in creating a uniformly-trimmed edge, while eliminating the need for complicated ancillary devices or techniques to perform this function. Because of the previously described orientation, flanged edging roller 190 can be of sufficient diameter to allow easy rolling on most surfaces, while maintaining a consistent distance between the cutting plane and the object being edged, regardless of the angular orientation of the trimmer with respect to the operator or the working plane.

It will be seen that motor shaft 210 extends through motor mounting plate 150, flange washer 180, edging roller 190, and bottom flange 200. Upper end of motor coupling 220 is attached to the end of motor shaft 210.

Figure 6:
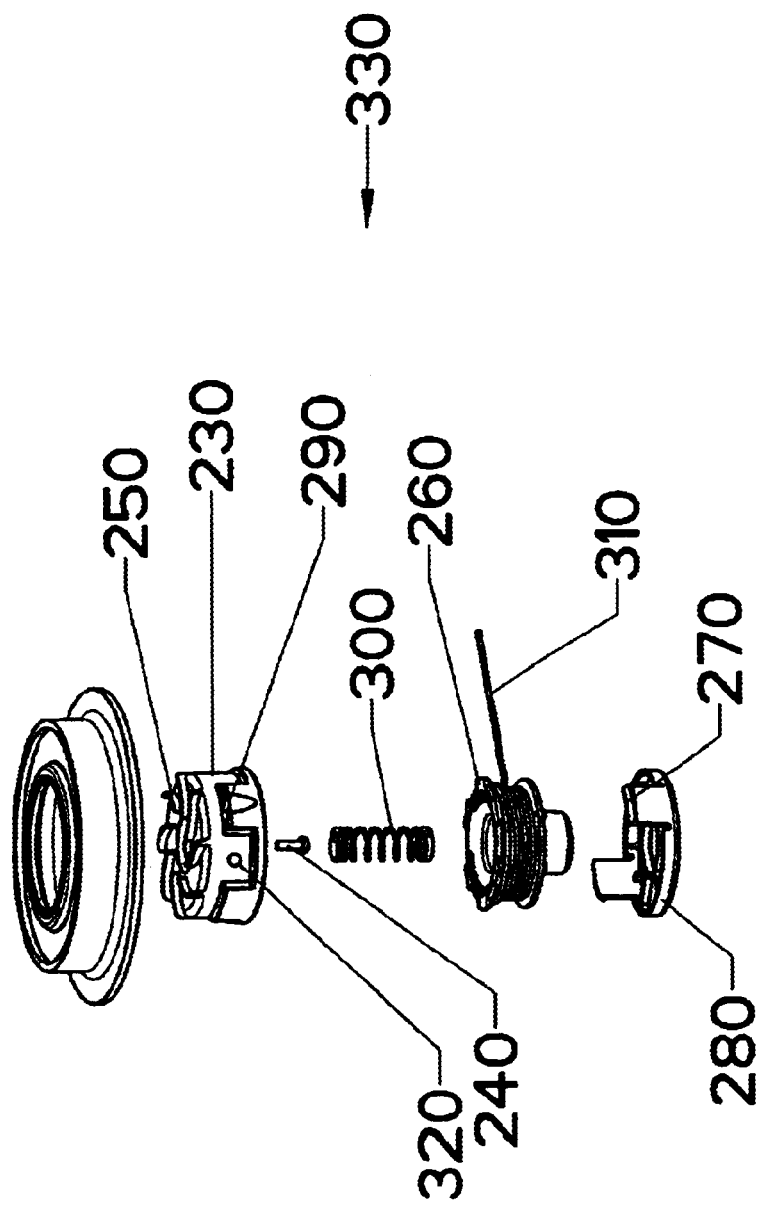
FIG. 6 is an exploded perspective view of the roller edging guide and linehead assembly of the combination lawn trimmer and edger unit of the present invention.
Figure 7:
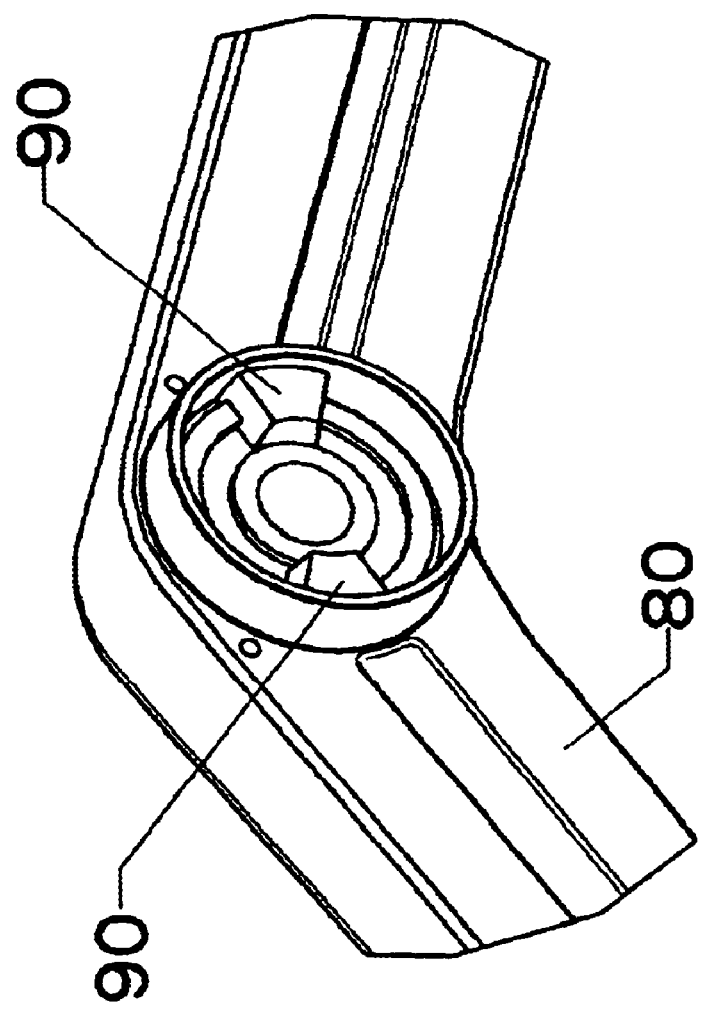
FIG. 7 is a perspective view of the handle of the combination lawn trimmer and edger unit of the present invention, showing the tapered locating cams of the handle of the unit.
Figure 8:
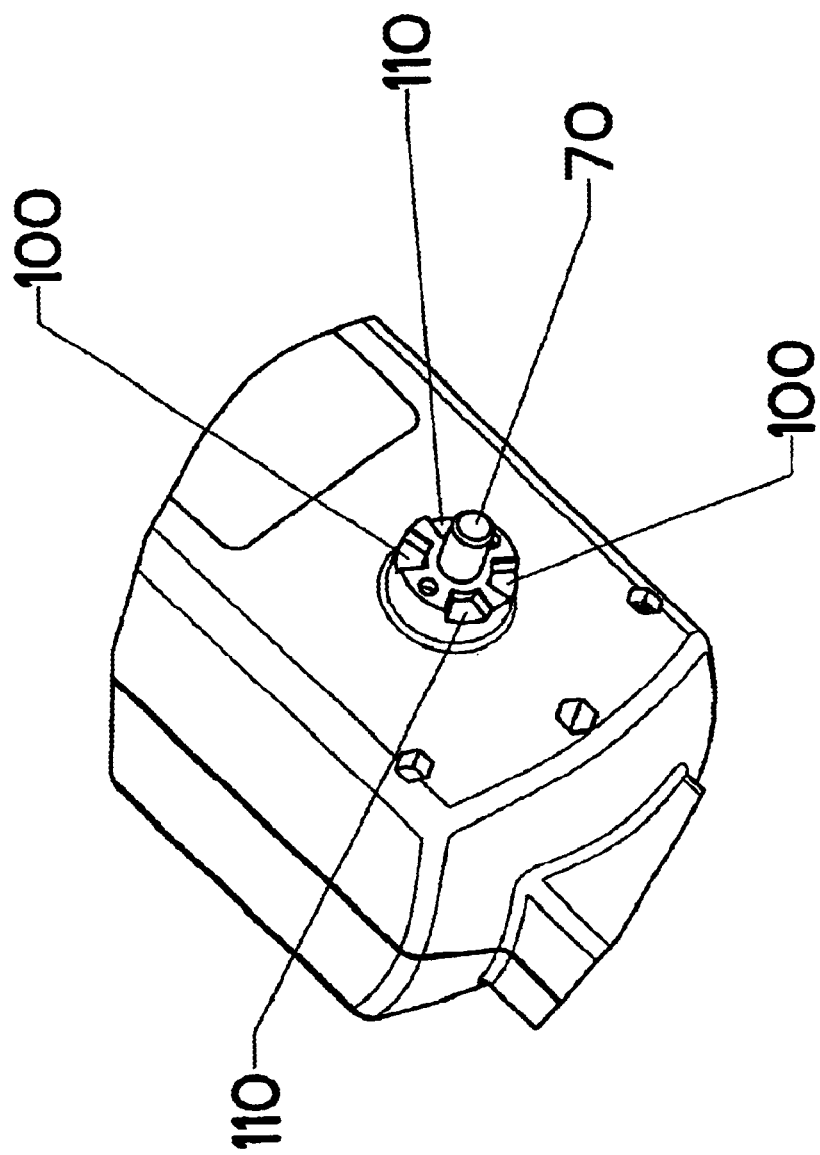
FIG. 8 is a perspective view of the handle pivot pin and locating slots of the combination lawn trimmer and edger unit of the present invention; and, FIG. 9 is a perspective view of an alternate embodiment of the combination lawn trimmer and edger unit of the present invention showing the handle, switches, and adjustment knobs.

Referring now to FIG. 6, linehead housing 230 overlies lower end of motor coupling 220 and is held in place by screw 240. Upper side of linehead housing 230 has fan blades, 250, preferably integrally molded therein to provide airflow to cool motor assembly 170. Linehead spool 260 slips into linehead housing 230 and is held in place by tabs 270 on the side of linehead cover 280, which further engage slots 290 in linehead housing 230. Spring 300 is provided between linehead spool 260 and linehead housing 230, in order to bias linehead spool 260 against linehead cover 280.

Line 310, which is used as the preferred cutting means, is wrapped about linehead spool 260 and is then extended through hole 320 in linehead housing 230. Linehead housing 230, spring 300, linehead spool 260, linehead cover 280, and screw 240, accordingly, are seen to comprise linehead assembly 330.

When motor 170 is energized, linehead assembly 330 rotates, causing line 310 to revolve about the axis of linehead spool 260. Spinning line 310 may then be advanced by the user of unit 10 into the lawn area which is to be trimmed.

In operation, with unit 10 configured for use as a trimmer, the operator grasps control handle 20 and front handle 80. Switch 40a, located upon the top of unit 10 is depressed by the operator's thumb. Switch 40b, located upon the bottom of unit 10 is used as a conventional trigger-type switch, and is depressed by the operator's index finger. Both switches 40a, 40b must be depressed for unit 10 to operate. When linehead assembly 330 begins spinning, unit 10 may be moved from side-to-side in a sweeping motion, and is thereafter advanced into the lawn area to be trimmed.

When the operator desires to use unit 10 as an edger, all that is necessary is for the user to index front handle 80 into the edging position and then rotate unit 10 by 180 degrees. Switches 40a, 40b are operated as discussed hereinabove, their respective functions, however, being reversed. Since switches 40a, 40b are dual-acting, switch 40a is now engaged by the operator's thumb, and switch 40b is now on the bottom to be used as a conventional trigger-type switch. Both switches must be depressed, however, in order for unit 10 to operate.

In the edger position, when linehead housing assembly 330 starts spinning, the user rests circular area 190b of edging roller 190 upon a horizontally-oriented feature of an area to be edged. Flange 190a of edging roller 190 contacts a vertically-oriented feature of the area to be edged and acts to guide unit 10, which results in a uniformly trimmed edge.

Figure 9:
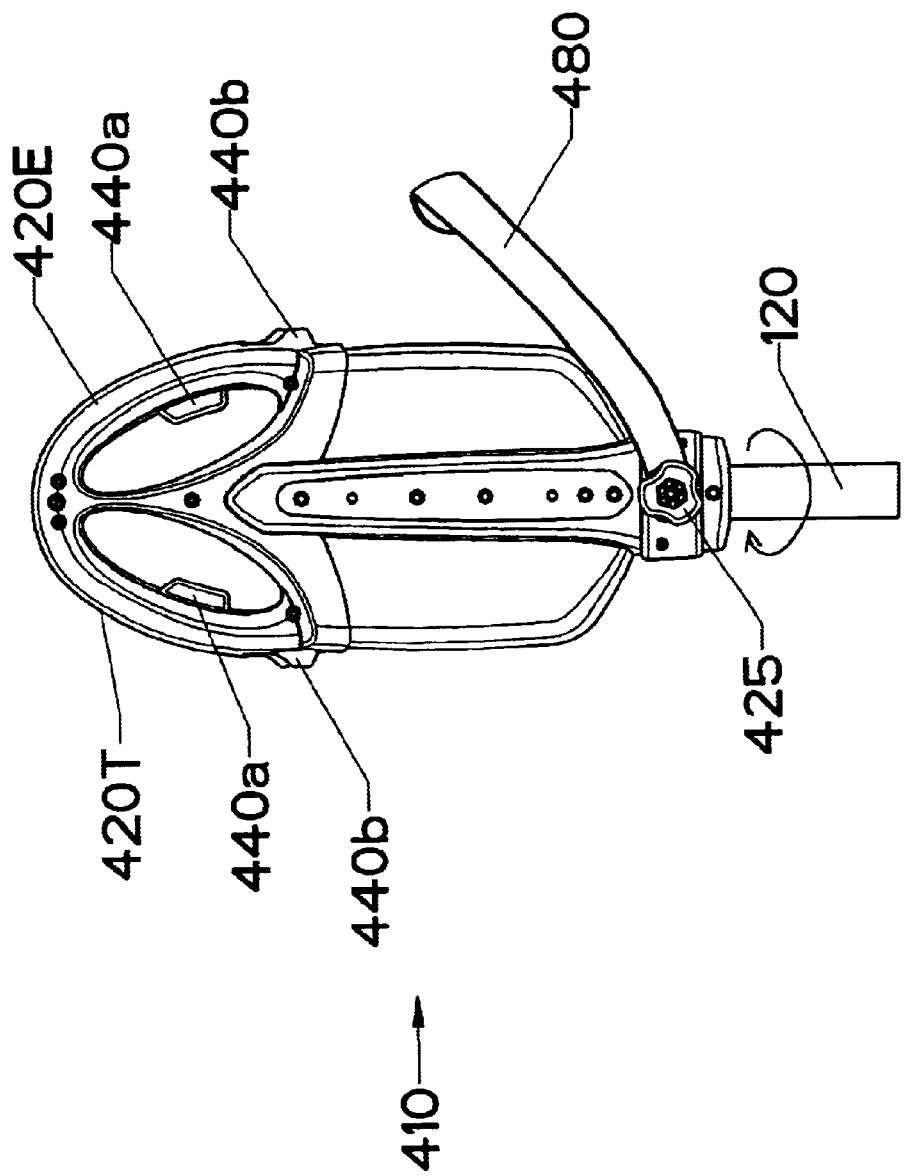

Referring next to FIG. 9, in an alternate embodiment designated unit 410, front handle 480 rotates on shaft 120 and is held in the respective operating position by a standard detent mechanism of a type well-known in the art. To change operating positions, the operator simply holds front handle 480 firmly and spins the rest of unit 410 about the axis of shaft 120 from a first operating position to the second operating position. The angle of front handle 480 may be adjusted with respect to shaft 120 for maximum operator comfort by loosening adjustment knobs 425, moving front handle 480 to a desired position, and re-tightening adjustment knobs 425.

Both the edging and trimming operating positions have first switch 440a for activation and second switch 440b for safety lockout purposes. Switches 440a, 440b are contained in control handle 420. Control handle 420 may comprise two symmetrical control handles designated 420t, 420e such that in either operating position, the operator holds the exact same structure. Accordingly, switches 440a, 440b are in the same control position relative to the user in either operating position. In order for unit 410 to function, one of activation switches 440a and its paired safety lockout switch 440b must both be engaged.

In operation, with unit 410 configured for use as a trimmer, the operator grasps control handle 420t and front handle 480. Switch 440b, located on the outer portion of control handle 420t, is depressed by the operator's thumb. Switch 440a, located on the inner portion of control handle 420t, is used as a conventional trigger-type switch, and is depressed by the operator's index finger. Both switches 440a, 440b must be depressed for unit 410 to operate. When linehead assembly 330 begins spinning, unit 410 may be moved from side-to-side in a sweeping motion, and is thereafter advanced into the lawn area to be trimmed.

When the operator desires to use unit 410 as an edger, all that is necessary is for the operator to rotate front handle 480 into the edging position and to rotate unit 410 by 180 degrees. The operator then grasps control handle 420e. The opposing set of switches 440a, 440b are operated as described hereinabove. Once again, both switches 440a, 440b must be engaged in order for unit 410 to operate.

In the edger position, when linehead housing 230 begins spinning, the user rests circular area 190b of edging roller 190 upon a horizontally-oriented feature of an area to be edged. Flange 190a of edging roller 190 contacts a vertically-oriented feature of the area to be edged and acts to guide unit 10, which results in a uniformly trimmed edge.

It will be recognized by one ordinarily skilled in the art that the disclosures made herein with regard to battery-operated combination vegetation trimmer and edger units are equally applicable to units driven by other means of motive force; including, but not limited to gasoline engines, or the like. Specifically, features comprising either individually or in combination, a multi-position front handle; a multi-position control handle; a roller edging guide comprising a flange of sufficient diameter to allow easy rolling while maintaining consistent distance between the cutting plane and the object being edged around; and/or, motor activation switches located equally conveniently to either operating position about the control handle of the unit are equally applicable to units having non-battery powered engines.

It should also be noted that where parts are attached or fastened together they may be riveted, screwed, snapped, glued, or otherwise affixed by any other equivalent means, known in the art, to accomplish the attachment.

It should also be apparent to one ordinarily skilled in the art that alternate cutting means may be utilized in lieu of the cutting line disclosed by the above described several embodiments. Such alternate cutting means might include a blade or blades, plastic cutter or cutters, or the like.

Similarly, it should also be apparent to one ordinarily skilled in the art that the activation switches utilized within the present invention might include any of a variety of other forms of activators, including electronic, mechanical, and electromechanical forms.

Having thus described preferred embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

We claim:

1. A combination vegetation trimmer and edger comprising:
    (a.) a motor, said motor affixed to a shaft;
    (b.) a head for carrying cutting means, said head mechanically coupled to said motor and supported by said shaft;
    (c.) a control handle, said control handle affixed to said shaft and operable in a first operator control position and a second operator control position;
    (d.) a front handle operable between first and second positions; and,
    (e.) means for actuating said motor, said means positioned upon said control handle and adapted so as to allow actuation in said first operator control position and in said second operator control position,
  whereby said combination vegetation trimmer and edger may be used in a first, horizontal cutting plane position for lawn and weed trimming, and may be further used in a second, vertical cutting plane position for edging.

2. The combination vegetation trimmer and edger of claim 1 further comprising an edging roller carried by said head.

3. The combination vegetation trimmer and edger of claim 2 wherein said edging roller further comprises a flange.

4. The combination vegetation trimmer and edger of claim 1 wherein said cutting means comprises a linehead for carrying cutting line.

5. The combination vegetation trimmer and edger of claim 1 wherein said cutting means comprises a blade.

6. The combination vegetation trimmer and edger of claim 1 further comprising a battery for powering said motor, said battery mounted in a location so as to be equally balanced in either operating position.

7. The combination vegetation trimmer and edger of claim 1 wherein said motor is carried within said head.

8. The combination vegetation trimmer and edger of claim 1 wherein said front handle is carried by a pivot pin.

9. The combination vegetation trimmer and edger of claim 8 wherein said front handle is indexable into each of said first and second positions.

10. A combination vegetation trimmer and edger comprising:
    (a.) a motor, said motor affixed to a shaft;
    (b.) a head for carrying cutting means, said head mechanically coupled to said motor and supported by said shaft;
    (c.) an edging roller carried by a lower portion of said head and disposed so as to be concentrically rotatable with respect to said cutting means;
    (d.) a control handle, said control handle operable in a first operator control position and a second operator control position;

(e.) a front handle operable between first and second positions; and, (f.) means for actuating said motor, said means positioned upon said control handle and adapted so as to allow rotation of said trimmer and edger about the axis of said shaft, whereby said combination vegetation trimmer and edger may be used in a first, horizontal cutting plane position for lawn and weed trimming, and may be further used in a second, vertical cutting plane position for edging, while maintaining the same relative operator control position.

11. A combination vegetation trimmer and edger comprising:

(a.) a motor, said motor affixed to a shaft;

(b.) a head for carrying cutting means, said head mechanically coupled to said motor and supported by said shaft;

(c.) a control handle, said control handle operable in a first operator control position and a second operator control position;

(d.) a front handle operable between first and second positions; and, (e.) means for actuating said motor, said means for actuating said motor comprising a first motor activation switch and a second motor activation switch, said means positioned upon said control handle and adapted so as to allow rotation of said trimmer and edger about the axis of said shaft, whereby said combination vegetation trimmer and edger may be used in a first, horizontal cutting plane position for lawn and weed trimming, and may be further used in a second, vertical cutting plane position for edging, while maintaining the same relative operator control position.

12. The combination vegetation trimmer and edger of claim 11 wherein said first and second motor activation switches each further comprise an activation position and a safety lockout position.

13. The combination vegetation trimmer and edger of claim 11 wherein said switches are disposed symmetrically about said control handle.

14. A combination vegetation trimmer and edger comprising:

(a.) a motor, said motor affixed to a shaft;

(b.) a head for carrying cutting means, said head mechanically coupled to said motor and supported by said shaft;

(c.) a control handle, said control handle operable in a first operator control position and a second operator control position;

(d.) a front handle operable between first and second positions, wherein said front handle is carried by said shaft and is rotatable thereabout between said first and second positions, and (e.) means for actuating said motor, said means positioned upon said control handle and adapted so as to allow rotation of said trimmer and edger about the axis of said shaft, whereby said combination vegetation trimmer and edger may be used in a first, horizontal cutting plane position for lawn and weed trimming, and may be further used in a second, vertical cutting plane position for edging, while maintaining the same relative operator control position.

15. A combination vegetation trimmer and edger comprising:

(a.) a motor, said motor affixed to a shaft;

(b.) a head for carrying cutting means, said head mechanically coupled to said motor and supported by said shaft;

(c.) a control handle affixed to said shaft;

(d.) a front handle;

(e.) an edging roller carried by said head, said roller disposed to be concentrically rotatable about the cutting axis of said head; and, (f.) means for actuating said motor, whereby said combination vegetation trimmer and edger may be used in a first, horizontal cutting plane position for lawn and weed trimming, and may be further used in a second, vertical cutting plane position for edging.

16. The combination vegetation trimmer and edger of claim 15 wherein said edging roller further comprises a vertical flange.

17. The combination vegetation trimmer and edger of claim 15 wherein said edging roller is carried by a lower portion of said head.

18. The combination vegetation trimmer and edger of claim 15 wherein said cutting means comprises a linehead for carrying cutting line.

19. The combination vegetation trimmer and edger of claim 15 wherein said cutting means comprises a blade.

20. The combination vegetation trimmer and edger of claim 15 further comprising a battery for powering said motor, said battery mounted in a location so as to be equally balanced in either position.

21. The combination vegetation trimmer and edger of claim 15 wherein said motor is carried within said head.

22. The combination vegetation trimmer and edger of claim 15 wherein said front handle is carried by a pivot pin.

23. The combination vegetation trimmer and edger of claim 22 wherein said front handle is indexable into each of said first and second positions.

24. A combination vegetation trimmer and edger comprising:

(a.) a motor, said motor affixed to a shaft;

(b.) a head for carrying cutting means, said head mechanically coupled to said motor and supported by said shaft;

(c.) a control handle;

(d.) a front handle;

(e.) an edging roller carried by said head, said roller disposed to be concentrically rotatable about the cutting axis of said head; and, (f.) means for actuating said motor, said means for actuating said motor comprising a first motor activation switch and a second motor activation switch, said switches positioned upon said control handle and adapted so as to allow rotation of said trimmer and edger about the axis of said shaft, whereby said combination vegetation trimmer and edger may be used in a first, horizontal cutting plane position for lawn and weed trimming, and may be further used in a second, vertical cutting plane position for edging.

25. The combination vegetation trimmer and edger of claim 24 wherein said first and second motor activation switches each further comprise an activation position and a safety lockout position.

26. The combination vegetation trimmer and edger of claim 24 wherein said switches are disposed symmetrically about said control handle.

27. A combination vegetation trimmer and edger comprising:

(a.) a motor, said motor affixed to a shaft;

(b.) a head for carrying cutting means, said head mechanically coupled to said motor and supported by said shaft;

(c.) a control handle;

(d.) a front handle; said front handle carried by said shaft and rotatable thereabout between said first and second positions;

(e.) an edging roller carried by said head, said roller disposed to be concentrically rotatable about the cutting axis of said head; and, (f.) means for actuating said motor, whereby said combination vegetation trimmer and edger may be used in a first, horizontal cutting plane position for lawn and weed trimming, and may be further used in a second, vertical cutting plane position for edging.

28. A combination vegetation trimmer and edger comprising:

(a.) a motor, said motor affixed to a shaft;

(b.) a head for carrying cutting means, said head mechanically coupled to said motor and supported by said shaft;

(c.) a control handle carrying first and second motor activation means, said control handle operable in first and second control positions;

(d.) a front handle operable between first and second positions; and, (e.) an edging roller carried by said head, whereby said combination vegetation trimmer and edger may be used in a first, horizontal cutting plane position for lawn and weed trimming, and may be further used in a second, vertical cutting plane position for edging.

29. The combination vegetation trimmer and edger of claim 28 wherein said edging roller further comprises a vertical flange.

30. The combination vegetation trimmer and edger of claim 28 wherein said edging roller is carried by a lower portion of said head and is disposed so as to be concentrically rotatable with respect to said cutting means.

31. The combination vegetation trimmer and edger of claim 28 wherein said cutting means comprises a linehead for carrying cutting line.

32. The combination vegetation trimmer and edger of claim 28 wherein said cutting means comprises a blade.

33. The combination vegetation trimmer and edger of claim 28 further comprising a battery for powering said motor, said battery mounted in a location so as to be equally balanced in either position.

34. The combination vegetation trimmer and edger of claim 28 wherein said motor is carried within said head.

35. The combination vegetation trimmer and edger of claim 28 wherein said first and second means for activating said motor each comprise a switch, said switches positioned upon said control handle and adapted so as to allow rotation of said trimmer and edger about said shaft.

36. The combination vegetation trimmer and edger of claim 35 wherein said first and second motor activation switches each further comprise an activation position and a safety lockout position.

37. The combination vegetation trimmer and edger of claim 35 wherein said switches are disposed symmetrically about said control handle.

38. The combination vegetation trimmer and edger of claim 28 wherein said front handle is carried by a pivot pin.

39. The combination vegetation trimmer and edger of claim 38 wherein said front handle is indexable into each of said first and second positions.

40. The combination vegetation trimmer and edger of claim 28 wherein said front handle is carried by said shaft and is rotatable thereabout between said first and second positions.

41. A combination vegetation trimmer and edger comprising:

(a.) a motor, said motor affixed to a shaft;

(b.) a head for carrying cutting means, said head mechanically coupled to said motor and supported by said shaft;

(c.) a control handle, said control handle operable in a first operator control position and a second operator control position;

(d.) a front handle; and, (e.) means for actuating said motor, said means positioned upon said control handle, said means for actuating said motor comprising a first motor activation switch and a second motor activation switch, whereby said combination vegetation trimmer and edger may be used in a first, horizontal cutting plane position for lawn and weed trimming, and may be further used in a second, vertical cutting plane position for edging.

42. The combination vegetation trimmer and edger of claim 41, further comprising an edging roller, said edging roller carried by said head and disposed so as to be concentrically rotatable with respect to said cutting means.

43. A combination vegetation trimmer and edger comprising:

(a.) a motor, said motor affixed to a shaft;

(b.) a head for carrying cutting means, said head mechanically coupled to said motor and supported by said shaft;

(c.) at least one control handle affixed to said shaft;

(d.) a front handle; and, (e.) means for actuating said motor, said means positioned upon said at least one control handle, said means for actuating said motor comprising at least one motor activation switch, whereby said combination vegetation trimmer and edger may be used in a first, horizontal cutting plane position for lawn and weed trimming, and may be further used in a second, vertical cutting plane position for edging.

* * * * *